United States Patent [19]

Setina

[11] Patent Number: 5,683,021
[45] Date of Patent: Nov. 4, 1997

[54] LOCKED GUN CASE FOR VEHICLE

[75] Inventor: Terry L. Setina, Olympia, Wash.

[73] Assignee: J. R. Setina Manufacturing Co., Inc., Olympia, Wash.

[21] Appl. No.: 402,339

[22] Filed: Mar. 10, 1995

[51] Int. Cl.⁶ .................................................. B60R 7/00
[52] U.S. Cl. .................. 224/311; 224/282; 224/913; 206/317; 248/553; 211/64; 70/160; 70/162; 70/279
[58] Field of Search .................... 224/282, 311, 224/911, 912, 913, 326; 206/317; 248/553; 211/60.1, 64; 70/63, 159, 160, 161, 162, 279

[56] References Cited

U.S. PATENT DOCUMENTS

| | | | |
|---|---|---|---|
| 1,914,259 | 6/1933 | Irwin . | |
| 2,140,870 | 12/1938 | Emery | 224/2 |
| 3,326,385 | 6/1967 | Pinkerton et al. | 211/4 |
| 3,464,606 | 9/1969 | Nordeen | 312/242 |
| 4,260,091 | 4/1981 | French et al. | 224/311 |
| 4,747,280 | 5/1988 | Shaw | 70/279 |
| 5,116,010 | 5/1992 | McMasters et al. | 248/309 |
| 5,138,786 | 8/1992 | Fischer | 42/106 |
| 5,161,396 | 11/1992 | Loeff | 70/63 |
| 5,310,103 | 5/1994 | Weber et al. | 224/311 |
| 5,350,094 | 9/1994 | Morford | 224/42 |

OTHER PUBLICATIONS

"Protection That's Over and Above the Others", Tufloc brochure, Esmet, Inc.
"Santa Cruz Gunlocks" brochure, Santa Cruz Associates, Ltd.
"Components for the Chevrolet Caprice and Ford Crown Victoria", Cruisers brochure.
"Stop Agonizing Over Where to Put the Shotgun . . . ", Troy Products brochure.
"Overhead Gun Rack—Air Bag Friendly", Pro-Gard Industries brochure.
"Santa Cruz Weapon Mounting Systems", Santa Cruz Associates, Ltd. brochure.
"Law Enforcement Weapon Mounts", Big Sky Racks, Inc. brochure.

*Primary Examiner*—Henry J. Recla
*Assistant Examiner*—Timothy L. Maust
*Attorney, Agent, or Firm*—Klarquist Sparkman Campbell Leigh & Whinston, LLP

[57] ABSTRACT

A gun case for mounting in a vehicle is disclosed including a container within which the gun is substantially entirely contained and a lid which is locked to such container. An electrically actuated lock is employed which includes a plurality of latches spaced along the gun case and a common actuator plate which slides longitudinally to unlock the latches in response to an electrical actuator device such as a solenoid or an electric motor. The container pivots down to a lowered unlocked position away from the lid to enable the gun to be removed from the container. A cam actuated locking mechanism is provided to lock the container to the lid when the container is pivoted upward to a raised locked position. A key actuated mechanism moves the actuator plate to unlock the container when the electrical actuator does not operate.

20 Claims, 3 Drawing Sheets

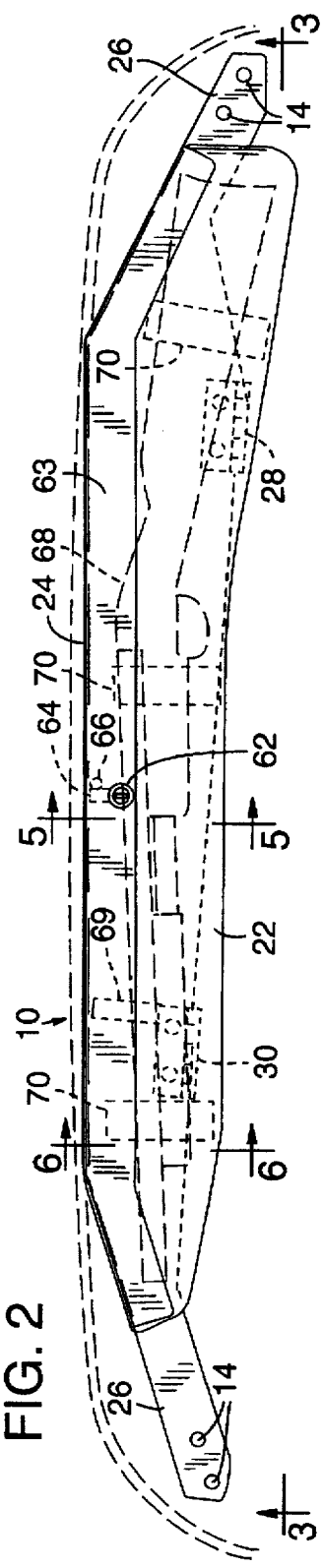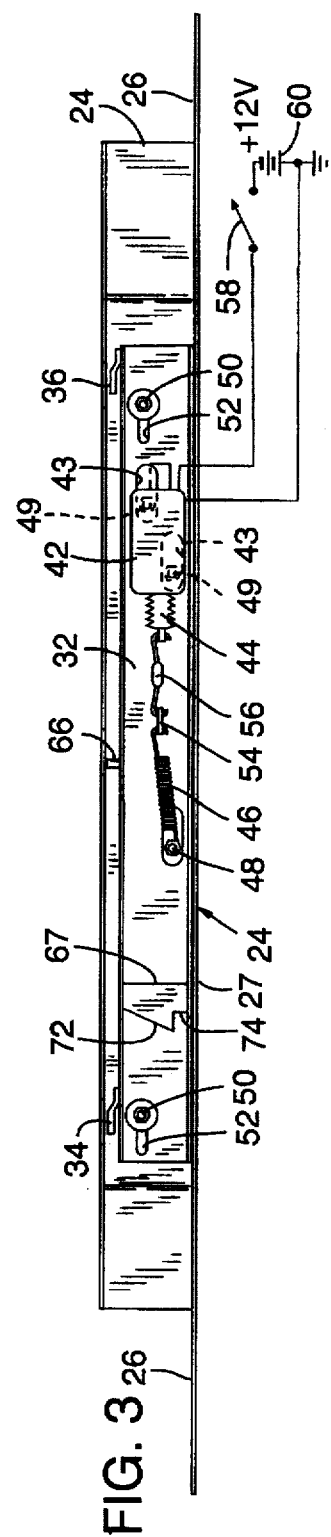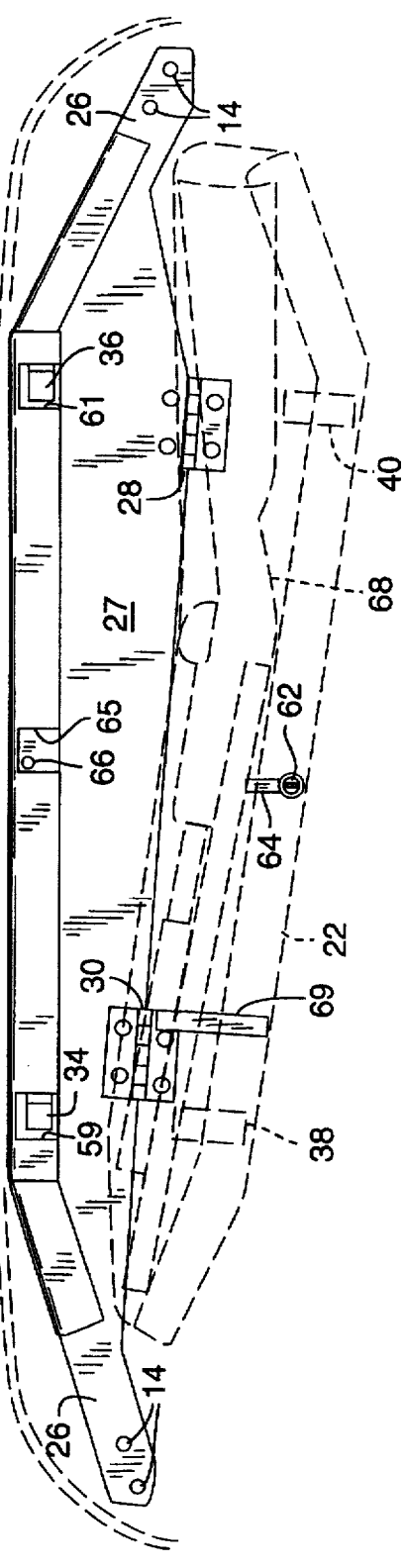

LOCKED GUN CASE FOR VEHICLE

BACKGROUND OF THE INVENTION

1. Field of the Invention

The subject matter of the present invention relates to gun cases for mounting in vehicles and in particular to such a gun case including a container portion within which the gun is substantially entirely contained and a lid which is locked to such container by a lock mechanism which can be unlocked by an electrical control with a remote switch or mechanically operated by a key in the case of power failure. The gun case may be mounted on the front side of a partition separating the front seat from the rear seat of the vehicle positioned above the partition window adjacent to the roof of the vehicle.

2. Prior Art

It has previously been proposed in U.S. Pat. No. 4,747,280 of Charles R. Shaw, issued May 31, 1988, and U.S. Pat. No. 5,350,094 of Ted Morford, issued Sep. 27, 1994, to provide a gun rack having a mount for mounting in a vehicle with a locking device which secures the gun to the rack. However, these prior gun rack mounting devices do not substantially completely enclose the gun within a gun case and in fact do not enclose even the trigger mechanism of the gun to prevent discharge of the gun or other tampering. Thus it is possible for unauthorized personnel such as prisoners to fire or otherwise obtain access to the gun without opening the locking device. In the Shaw patent, the locking device is operated by an electrical control including a remote push button switch as well as by a mechanical operating mechanism actuated by a key which operates a clam shell type locking device that extends around a mid portion of the barrel of a rifle or shotgun at a position forward of the trigger mechanism. In Shaw the gun rack mounts the rifle or shotgun in a vertical position on the floor of the vehicle. However, in the Morford patent a gun is mounted horizontally adjacent the roof of the vehicle. In neither patent however is a gun case employed which substantially completely encloses the gun along with a locking mechanism for locking the case with a plurality of spaced latches which are unlocked by a single common sliding locking plate for quickly opening the gun case when the lock is operated by an electrical control in the manner of the present invention.

Gun racks for vehicles have previously been provided as shown in U.S. Pat. No. 3,326,385 of Pinkerton et al., issued Jun. 20, 1967, with an electrically operated locking mechanism including a solenoid and a movable locking pin which operates two locks simultaneously for unlocking two guns mounted on different supports of the gun rack apparatus. However unlike the present invention, in the Pinkerton patent there is no gun case substantially completely enclosing the gun with a lock mechanism including a plurality of latches spaced along the gun case which are simultaneously operated by an electrical actuating mechanism including a sliding locking plate.

Another gun carrier of a vehicle is shown in U.S. Pat. No. 2,140,870 of Emery, issued Dec. 20, 1938, which locks the gun in the carrier beneath the dashboard of an automobile by a mechanical latch operated by a link connected at one end to a knob which is pulled by the vehicle operator to release the gun from the carrier. This apparatus employs a spring which ejects the gun backward out of the case into the lap of the operator or passenger of the vehicle. This is extremely dangerous and could happen while the vehicle is moving by accidentally operating the lock release.

The locked gun case of the present invention has the advantage over these prior patents that the gun is completely contained within the gun case which is locked securely to protect it from being tampered with by unauthorized personnel and to prevent it from accidentally being dislodged or discharged due to a traffic accident or by intentional efforts of prisoners or other unauthorized persons. Another advantage is that the gun case may be quickly and easily opened by an electrical lock operating mechanism pivoting the gun container downward away from the lid for immediate access in emergencies but the gun stays in its container until removed by the operator for safe handling.

The locked gun case apparatus of the present invention has a further advantage of a simple, reliable lock operating mechanism for unlocking a plurality of latches spaced along the case simultaneously by means of a common locking plate which slides longitudinally when actuated by an electrical drive mechanism such as an electric motor or solenoid to unlock the lock. In addition, a cam actuated locking mechanism is employed to move the locking plate into the locked position as the gun container is pivoted from a lowered unlocked position to a raised locked position where it is locked to the lid by engaging a cam member on such plate with a cam follower attached to the container case. In addition, a manual key lock actuated operating mechanism can be employed to unlock the gun case in the event that the electrical control system malfunctions. The gun case of the present invention has the added advantage that it may be mounted on a roll bar within the vehicle in a secure storage position above a partition window and on the front side of a vertical partition separating the front seat from the rear seat of the vehicle so that it does not obstruct the view of the vehicle driver.

SUMMARY OF THE INVENTION

It is therefore one object of the present invention to provide an improved, locked gun case for mounting in a vehicle which safely stores a gun so that it is substantially entirely contained within the gun case and cannot be accidentally fired, dislodged or otherwise removed from the gun case.

Another object of the present invention is to provide such a locked gun case including a gun container which is pivotally mounted within the vehicle to pivot between a raised locked position where the container is locked to the lid of the gun case and a lowered unlocked position where the container is open to enable the gun to be removed therefrom.

A further object of the invention is to provide such a locked gun case with an improved locking mechanism including a plurality of latches for securing the lid to the container at a plurality of positions spaced along the length of the gun case which are simultaneously operated by a common locking plate which slides longitudinally between a locked and unlocked position.

Still another object of the invention is to provide such a locked gun case in which the locking mechanism is unlocked by means of an electrical actuating device such an electrical motor or a solenoid for moving the common locking plate into the unlocked position to unlock all the latches and allow the container to pivot downward into an open unlocked position.

A still further object of the invention is to provide such a locked gun case in which a cam actuated locking mechanism is employed to automatically lock the lid to the container when the container is moved from the lowered unlocked position to the raised locked position.

An additional object of the present invention is to provide such a locked gun case in which a manual key actuated mechanical operating mechanism is employed to unlock the gun case in the event that the electrical operating mechanism malfunctions.

DESCRIPTION OF THE DRAWINGS

Other objects and advantages of the present invention will be apparent from the following detailed description of a preferred embodiment thereof and from the attached drawings of which:

FIG. 2 is a front elevation view of the gun case of FIG. 1;

FIG. 3 is a horizontal section view taken along the line 3—3 of FIG. 2 with the gun container removed for clarity;

FIG. 4 is a front elevation view of the gun case of FIGS. 2 and 3 with the gun container in a lowered, unlocked position;

DESCRIPTION OF PREFERRED EMBODIMENT

Figure 1:
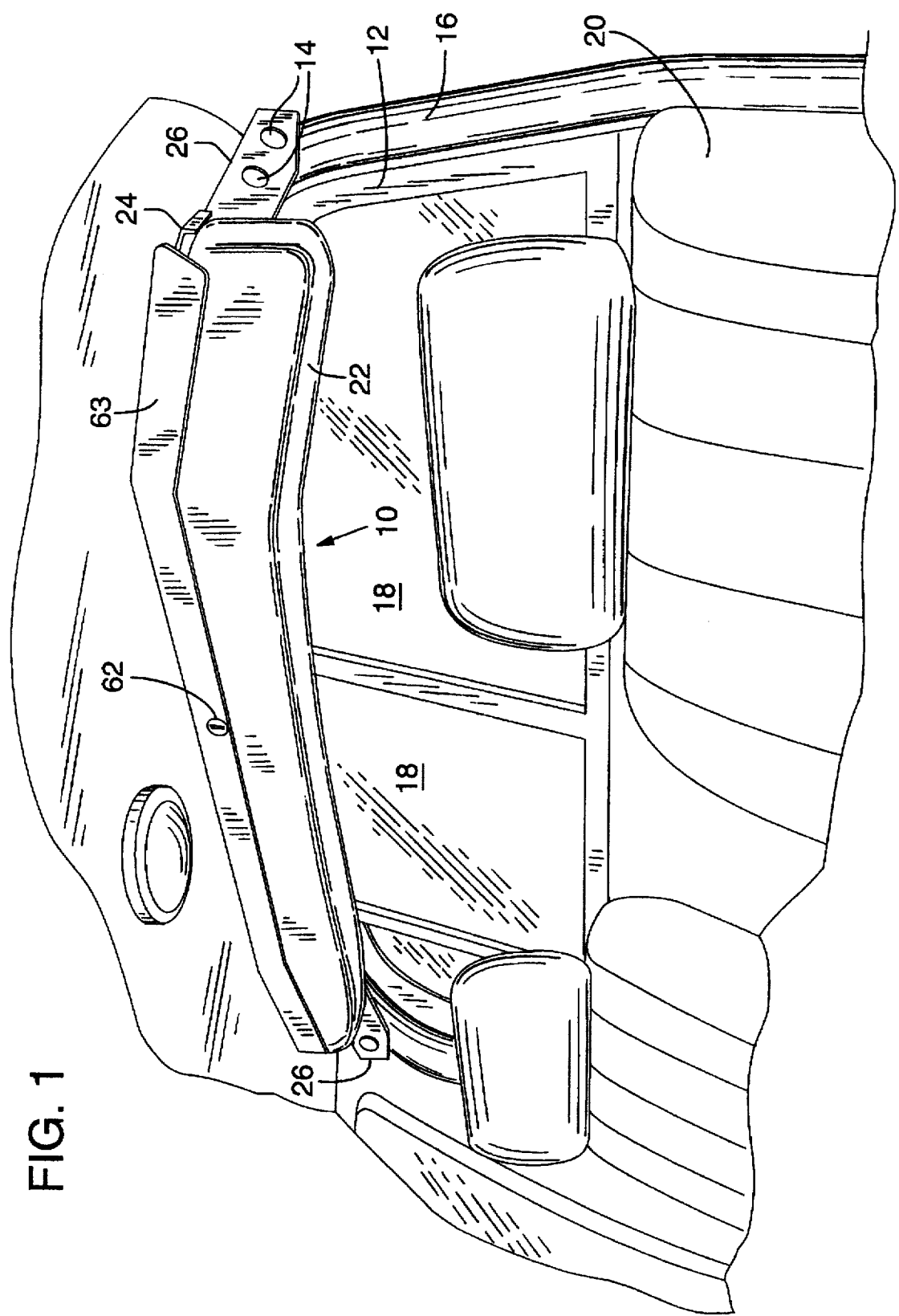
FIG. 1 is an oblique view of the gun case of the present invention shown mounted on the front seat side of an automobile partition.

As shown in FIG. 1, a preferred embodiment of the gun case 10 of the present invention is shown mounted on the front seat side of a vertical partition 12 separating the front seat from the rear seat of an automobile. The gun case is preferably fixed by bolts 14 to a U-shaped tubular roll bar 16 supporting the partition 12. The roll bar is fixedly secured to the floor of the automobile and to the side of the door pillars in a conventional manner to protect the passengers of the vehicle in the event it should roll over during an accident. The partition 12 is provided with transparent plastic window portions 18 through which front seat passengers in the vehicle can see to observe the condition of prisoners or other passengers in the rear seat of the vehicle. Thus the driver of the vehicle seated in the left-hand front seat 20 can see beneath the gun case 10 through the partition window 18 into the rear seat of the automobile. The gun case is mounted adjacent the roof of the vehicle so that it extends horizontally over the top of the window 18 to leave an unobstructed view through the window. The gun case includes a pivoted gun container 22 which is locked in a closed position to a lid 24 of the gun case. The gun container 24 is of a generally U-shaped cross-section and is made of a molded plastic material such as a fiberglass reinforced plastic having a foam plastic liner or inserts 70 to securely hold the shotgun, rifle or other fire arm within the container. The lid 24 is made of metal and has a lock mounted on the inside of such lid to lock the container to the lid as hereinafter shown in FIGS. 3 and 4.

As shown in FIG. 2, the gun case 10 has a pair of metal mounting flanges 26 extending from the opposite ends of the back plate portion 27 of lid 24 for attachment by bolts 14 to the roll bar 16 or other suitable mounting device within the vehicle. The gun container 22 is pivotally connected by a pair of hinges 28 and 30 to the backplate portion 27 of the lid. As a result, the gun container 22 can pivot about the hinges 28 and 30 between a raised locked position shown in FIG. 2 and a lowered unlocked position shown in FIG. 4. In the unlocked position the gun can be removed from the container. However, in the locked position of container 22, the gun is secure within the gun case and cannot be removed by unauthorized personnel.

An electrically operated lock mechanism is mounted on the inside of the lid 24 for locking the gun container 22 to the lid in the raised position is shown in FIG. 3. The lock mechanism includes a movable common locking plate 32 which slides horizontally on the bottom surface of the lid 24 between a locked position shown in FIGS. 2 and 6 and an unlocked position shown in FIGS. 4 and 7. In the locked position two latches 34 and 36 fixed to the front side of the locking plate 32 at positions spaced along the length of the gun case 10 engage two catches 38 and 40, respectively on the inner surface of the front wall of the gun container 22. The common locking plate 32 is moved to the right in FIG. 3 by an electrical actuating device 42 which may be a solenoid or a DC electrical motor having a worm gear, with a plunger shaft 44. The plunger shaft 44 is connected to a flange 54 on the locking plate by a coupling element 56 to move such locking plate to the right for unlocking against the force of a coil spring 46 connected at one end to flange 54 and at its other end to the lid 24 by a bolt and nut fastener 48. The motor 42 is fixed to the lid 24 by mounting bolts 49 extending through a slot 43 in the locking plate 32 and causes such locking plate to move to the right when the motor or solenoid 42 is actuated to unlock the latches when the plunger 44 moves longitudinally to the right. The locking plate 32 is mounted on the lid 24 by mounting bolts 50 which extend through two elongated slots 52 in such plate to allow it to slide horizontally between the locked and the unlocked positions thereby engaging or releasing the latches 34 and 36 from the catches 38 and 40, respectively. The right end of the spring 42 is fixed to the lock actuator plate 32 at the flange 54 which is welded to such actuator plate. When the solenoid or motor 42 is actuated by an electrical control circuit the plunger 44 moves to the right thereby causing the actuator plate 32 to also move to the right as a result of the link 56 fixed to such plate at flange 44. This causes the latch elements 34 and 36 to disengage from the catches 38 and 40 to unlock the gun container 22 from the lid 24 thereby enabling the gun container to pivot downward by gravity into the lowered unlocked position 22, shown in FIGS. 4 and 7.

The electrical control circuit for actuating motor 42 includes a manual switch 58 which may be mounted on the dashboard of the vehicle. The switch which is normally open, is connected in series between the motor and the positive terminal of a 12 volt battery 60, such as the automobile battery, for operating the motor 42 when the switch is closed by the operator, as shown in FIG. 3.

If for some reason the electrical system for actuating the motor 42 is inoperative, a manual key operated lock 62 is provided on a metal face plate 63 fixed to the front of the container 24 for unlocking the gun case. The key lock includes a rotating lock member 64 which engages an actuator pin 66 fixed to the side of the locking plate 32 at a position mid way between latches 34 and 36, as shown in FIG. 3. Thus rotation of the key lock 62 clockwise causes the lock member 64 to engage the pin 66 which moves the actuating plate 32 horizontally to the right to unlock the gun case. It should be noted that rectangular slots 59 and 61 are provided in the front side of the lid 24 to enable the catches 38 and 40 to extend through the slots in the lid 24 in a position to be engaged by the latches 34 and 36. Similarly, a slot 65 is provided in the front side of the lid to enable the key operated latch 64 to engage the lock pin 66 as shown in FIG. 4.

Figure 5:
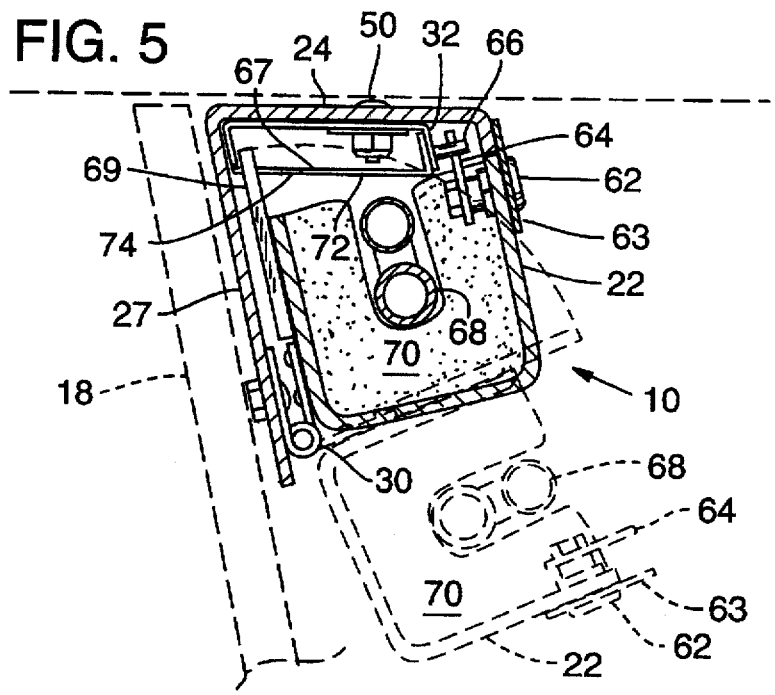
FIG. 5 is a vertical section view taken along the line 5—5 of FIG. 2.

As shown in FIG. 5, when the key lock 62 is operated to unlock the gun case by engaging actuator pin 66 to cause the locking plate 32 to move to the right in FIG. 3, the lid is unlocked and the gun container 22 pivots down from the solid-line closed position to the dashed-line open position in FIG. 5 determined by a stop (not shown). As a result, a shotgun 68 stored within the gun case is then made accessible to the operator of the vehicle. It should be noted that the shotgun 68 is shown mounted entirely within the gun container 22 and is spaced therefrom by foam plastic inserts 70 within the container.

Figure 6:
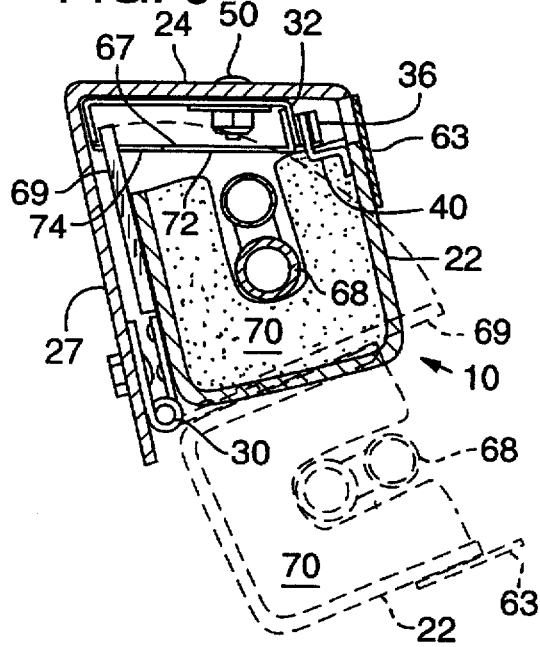
FIG. 6 is a vertical section view taken along the line 6—6 of FIG. 2.
Figure 7:
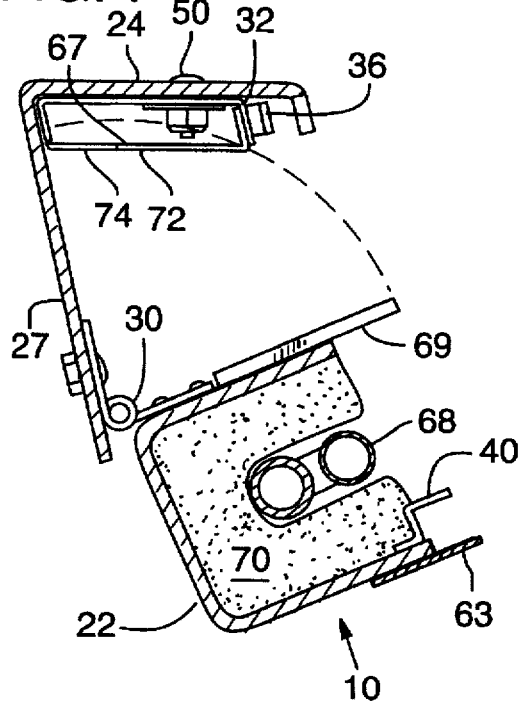
FIG. 7 is a vertical section view which is similar to FIG. 6 but shows the gun container in a lowered, unlocked position.

A cam actuated locking mechanism is provided for locking the lid to the container including a cam member 67 fixed to the lock actuator plate 32, as shown in FIG. 3. A cam follower element 69 is secured to the back side of the container 22 as shown in FIGS. 4 and 6 so that such element engages the cam member 67 at cam surface 72 when the container is pivoted upward from its lowered unlocked position to its raised locked position. The cam follower 69 urges the cam 67 and the actuator plate to the right against the force of spring 46 until it enters a cam slot 74 in the cam member when the spring moves the actuator plate to the left into a locked position.

It will be apparent to those having ordinary skill in the art that many changes may be made in the above-described preferred embodiment of the present invention without departing from the scope of the invention. Therefore the scope of the invention should be determined by the following claims.

I claim:

1. Gun case apparatus for a vehicle, comprising:
   an elongated gun case including a container adapted for containing a gun so that at least the major portion of the gun including the trigger is within said gun case;
   a lid for the gun case;
   an electrically actuated lock for locking said lid to said container with a plurality of movable lock members spaced along the gun case to secure the gun within said case;
   a mount adapted for mounting the gun case within a vehicle including a hinge connection so that said container can pivot relative to the lid between a locked position where said lid is locked to said container and an unlocked position where the container is unlocked from the lid and the gun case is open to enable the gun to be removed from said gun case; and
   an electrical control for operating said lock to move said plurality of lock members with a common actuation device to unlock the gun case and allow the container to pivot from said locked position to said unlocked position; and
   a locking cam mechanism for moving said common actuation device to lock the gun case when the container is pivoted from the unlocked position to the locked position.

2. Apparatus in accordance with claim 1 which also includes a cam actuator for moving said lock to lock said container to said lid when said container is pivoted from said unlocked position to said locked position.

3. Apparatus in accordance with claim 2 in which the lock includes a common actuation locking member which slides longitudinally of the gun case to operate a plurality of latches, said electrical control sliding the locking member into an unlocked position to unlock said latches, and said cam actuator sliding said locking member into a locked position to lock said latches.

4. Apparatus in accordance with claim 1 in which the electrical control includes an electrical drive for moving a plunger which is connected to a locking member which slides to operate a plurality of latches spaced along the case to unlock the lock.

5. Apparatus in accordance with claim 4 in which the electrical drive is an electrical motor for moving said plunger.

6. Apparatus in accordance with claim 4 in which the electrical drive is a solenoid for moving said plunger.

7. Apparatus in accordance with claim 1 in which the lock also includes a key operated actuator for unlocking said gun case if the electrical control is inoperative.

8. Apparatus in accordance with claim 3 in which the locking member is a locking plate mounted on the inside of the lid for sliding movement relative to said lid and has a plurality of latch members spaced along the edge of said locking plate for engagement with corresponding latch elements on the container.

9. Apparatus in accordance with claim 1 in which the gun case is adapted to mount a gun on the container for movement with said container.

10. Apparatus in accordance with claim 1 which also includes a partition separating the front seat from the rear seat of an automobile and having a partition window, said gun case being mounted horizontally above said partition window and on the front side of said partition.

11. Gun case apparatus for a passenger vehicle comprising:
    an elongated gun case including a container adapted for containing a gun so that at least the major portion of the gun is within said gun case;
    a lid for the gun case;
    a lock including a plurality of commonly actuated latches spaced along the gun case for locking said lid to said container to secure the gun within said case;
    a mount adapted for mounting the gun case within the vehicle, including a hinge connection so that said container can pivot relative to the lid between a raised locked position where said lid is locked to said container and a lowered unlocked position where the container is unlocked from the lid and the gun case is open to enable the gun to be removed from said gun case;
    an electrical lock control for operating said plurality of latches with a common actuation member to unlock the gun case and allow the container to pivot from said raised locked position to said lowered unlocked position; and
    a key operated cam actuator for moving the common actuator member to unlock the gun case when the electrical lock control is not used.

12. Apparatus in accordance with claim 11 which also includes a cam actuator for moving said common locking member to lock said container to said lid when said container is pivoted from said unlocked position to said locked position.

13. Apparatus in accordance with claim 12 in which the common actuation member is a locking plate which slides longitudinally of the gun case to operate a plurality of latches, said lock control sliding the locking plate into an unlocked position to unlock said latches, and said cam actuator sliding said locking plate into a locked position to lock said latches.

14. Apparatus in accordance with claim 11 in which the lock control includes an electrical drive for moving a plunger that is connected to the common locking member which unlocks the lock.

15. Apparatus in accordance with claim 14 in which the electrical drive is an electrical motor for moving said plunger.

16. Apparatus in accordance with claim 14 in which the electrical drive is a solenoid for moving said plunger.

17. Apparatus in accordance with claim 11 in which the control is an electrical control and the lock also includes a key operated actuator for unlocking said gun case if the electrical control is inoperative.

18. Apparatus in accordance with claim 13 in which the locking plate is mounted on the inside of the lid for sliding movement relative to said lid and has a plurality of latch members spaced along the edge of said locking plate for engagement with corresponding latch elements on the container.

19. Apparatus in accordance with claim 11 in which the gun case is adapted to mount a gun on the container for movement with said container and the gun case completely encloses the gun.

20. Apparatus in accordance with claim 11 which also includes a partition adapted to be mounted behind the front seat of an automobile, the partition has a window portion and the gun case is mounted on the partition above the window portion.

* * * * *